(Model.)
L. G. KEMP & P. ROSS.
GRAIN BINDER ATTACHMENT.
No. 264,707. Patented Sept. 19, 1882.
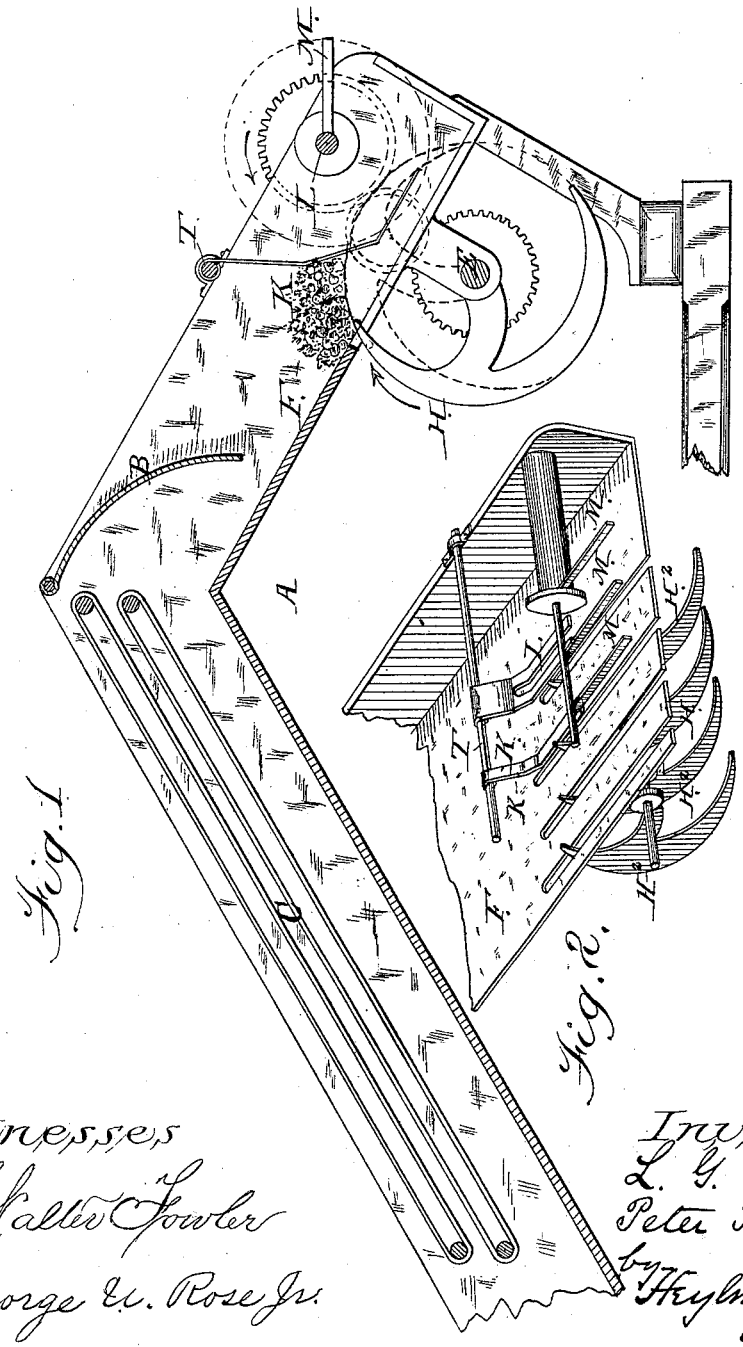
Witnesses
D. Walter Fowler
George U. Rose Jr.
Inventors;
L. G. Kemp.
Peter Ross,
by Heylmun & Kauz.
Attorneys.

United States Patent Office.

LEWIS G. KEMP AND PETER ROSS, OF FREDERICK, MARYLAND.

GRAIN-BINDER ATTACHMENT.

SPECIFICATION forming part of Letters Patent No. 264,707, dated September 19, 1882.

Application filed May 25, 1882. (Model.)

*To all whom it may concern:*

Be it known that we, LEWIS G. KEMP and PETER ROSS, citizens of the United States of America, residing at Frederick, in the county of Frederick and State of Maryland, have invented certain new and useful Improvements in Grain-Binder Attachments; and we do hereby declare the following to be a full, clear, and exact description of the invention, such as will enable others skilled in the art to which it appertains to make and use the same.

This invention relates to attachments for grain-binders; and its object is to separate the being bound sheaf or bundle of grain from the inflowing unbound grain, so as to prevent the tangling of the grain and the hanging together of the bundles after they have been bound.

Figure 1 represents a longitudinal sectional view of a portion of the upper frame and elevators of a grain-binder. Fig. 2 is a perspective view of a portion of a binding-table, showing the needle-shaft with the curved arms arranged on the opposite sides of the needle and discharging devices.

In the annexed drawings, the letter A represents the upper portion of a well-known grain-binder frame, with apron B and elevators C.

The letter E represents the needle-arm shaft, arranged under the platform or table F. This shaft is provided with a needle or binding arm, H, of a well-known construction. Mounted on this shaft, on opposite sides of the needle, (see Fig. 2,) are curved arms H², preferably of a shape corresponding to that of the needle-arm, but not so long, adapted to move with the needle-arm, so as to make the separation of the bundle being bound from the inflowing unbound grain. This needle-arm shaft, with its attachments, is operated by gearing or other means in the usual well-known manner. Immediately above the needle-arm shaft (see Figs. 1 and 2) is arranged a bar or support, T, provided with a series of downward and outward and yielding curved arms or fingers, K, adapted to operate in conjunction with the needle-arm and the curved cut-off arms of the needle-arm shaft. These downward-curved fingers K act as guards to prevent the grain from falling upon the tying mechanism beyond and to conduct the grain to the receiving-receptacle, which collects the grain into the sheaf or bundle for the action of the tying mechanism. (Not shown.)

The letter L represents a shaft arranged in the front of the fingers K and above the location of the tying mechanism. This shaft is provided with a plurality of arms or fingers, M, for the purpose, in their revolution, of discharging the sheaves or bundles after they have been properly bound. The shaft carrying the fingers M has a rotary motion communicated to it by suitable mechanism, while the needle-shaft has only an oscillating motion.

It will be observed by reference to the drawings that the binder-arm shaft, with cut-off arms, is located below the slotted table and the arms K are located above the table, serving as overhanging guards, and act, in conjunction with the binder-arm and cut-off arms, to hold the loose grain during the binding operation of the bundle; also, that the shaft, with the bundle-ejecting arms or fingers, is located above the table and in rear of the overhanging guard, and is so operated as to discharge the bound bundle as the binder-arm, with its cut-off, is being moved below the table.

Operation: The cut grain is carried forward and elevated, so as to be delivered upon the inclined platform or table F, where it is retarded by the apron B, then descends farther upon the incline until it reaches the guard-fingers K, which conduct it to the binding-receptacle, and when a sufficient quantity of the grain has accumulated to make a bundle the needle carrying the binding cord or wire is brought forward and around the bundle, so as to meet the band holding and uniting means to complete the band around the bundle, and when in position the knotting or twisting mechanism is brought into play for completing the uniting of the ends and the cutter for cutting the twine or wire from the bound bundle. The needle and curved cut-off arms, while in the elevated position during the process of forming the knot, will act as cut-offs, and, in connection with the fingers K, arrest the grain, as indicated in Fig. 1 of the drawings. When the needle and curved arms return to their normal position, as indicated by full lines in Fig. 1, for the next bundle the accumulated grain will descend and advance until arrested by stop devices, (not shown,) when the needle and its curved arms are again advanced to complete the band around the bundle and form the knot, and thus the operation is repeated. After the band has been tied around the bundle or sheaf the shaft L receives a rotary motion, and the arms or fingers M thereof are brought in contact with the bound bundle and discharge it from the machine.

It will be observed that by these improvements, during the process of tying the bundle, no loose grain is admitted into the binding-receptacle, but is held back in rear of the needle, curved arms, and the dependent guard-fingers K in such a manner as not to interfere or mingle with the bundle being bound, and that when the needle is returned to its normal position the accumulated grain is then permitted to descend into the receptacle for binding.

The importance of these improvements will be readily understood and appreciated by those skilled in the art.

The annexed drawings do not show any means for operating these parts, nor is any tying mechanism illustrated, for the reason that we reserve the right to use any well-known tying mechanism and means for operating the parts; and also these improvements can be applied to most any, if not all, of the grain-binders now upon the market.

What we claim as our invention, and desire to secure by Letters Patent, is—

The combination, with a binder-arm shaft located below the table and carrying cut-off arms, and the binder-arm and the outward and downward inclined overhanging yielding guards located above said table, the cut-off arms adapted to pass up through the guards, said guards and cut-off arms operating together, as described, of a rotary shaft located above the table and outside of the overhanging guards, and carrying the ejecting-arms operating to discharge the bound bundle as the arm and cut-off arms are being retracted below the table to admit the loose grain into the binding-receptacle, substantially as set forth.

In testimony whereof we affix our signatures in presence of two witnesses.

LEWIS G. KEMP.
PETER ROSS.

Witnesses:
HENRY WILLIAMS,
R. H. STOKES.